United States Patent [19]

Giffen, Jr. et al.

[11] Patent Number: 4,508,787

[45] Date of Patent: Apr. 2, 1985

[54] IMIDIZED SURFACE PROTECTION FOR MALEIC ANHYDRIDE INTERPOLYMER ARTICLES

[75] Inventors: William M. Giffen, Jr., Hudson; George S. Li, Macedonia; Arthur F. Miller, Lyndhurst, all of Ohio

[73] Assignee: The Standard Oil Company, Cleveland, Ohio

[21] Appl. No.: 217,482

[22] Filed: Dec. 17, 1980

[51] Int. Cl.$^3$ .......................... B32B 9/02; B05D 3/02
[52] U.S. Cl. ............................ 428/473.5; 427/385.5; 427/393.5; 427/399; 427/400
[58] Field of Search .................. 427/393.5, 399, 385.5, 427/400; 526/272, 311, 262, 271, 317; 428/473.5

[56] References Cited

U.S. PATENT DOCUMENTS

| | | | |
|---|---|---|---|
| 2,469,407 | 5/1949 | Powers | 526/311 X |
| 3,520,852 | 7/1970 | Pratt et al. | 526/272 X |
| 3,558,350 | 1/1971 | Fincke et al. | 427/385.5 X |
| 3,669,718 | 6/1972 | Chiu et al. | 428/341 |
| 4,168,359 | 9/1979 | Gaylord | 526/208 |
| 4,200,720 | 4/1980 | Evani et al. | 526/233 |
| 4,255,471 | 3/1981 | Boldebuck et al. | 427/385.5 |

*Primary Examiner*—Thurman K. Page
*Attorney, Agent, or Firm*—William A. Heidrich; Herbert D. Knudsen; Larry W. Evans

[57] ABSTRACT

A protective coating which is resistant to attack by basic solutions is formed from interpolymers containing maleic anhydride (MAH). An article is coated with a solution of the dissolved ammonium or amine salts of the MAH interpolymer, or if the article itself contains MAH the salts may alternatively be formed on the surface of the article by applying a basic solution containing the ammonium or amine ions. The article is then dried and heated at a temperature sufficient to form the cyclic imide structure from the ammonium or amine salt of the MAH, typically about 160 to 200° C.

13 Claims, No Drawings

IMIDIZED SURFACE PROTECTION FOR MALEIC ANHYDRIDE INTERPOLYMER ARTICLES

BACKGROUND OF THE INVENTION

1. Field of the Invention

This invention relates to a method for providing a protective surface on various articles, particularly maleic anhydride interpolymer resin moldings. In one embodiment this surface is achieved by forming the ammonium or amine salts of a maleic anhydride-containing interpolymer on the surface of an article, and then heating the article at a temperature sufficient to form the cyclic imide structure.

2. Description of the Prior Art

Resinous polymers are especially useful in a wide variety of thermofabricated articles. Styrene and maleic anhydride copolymers and reinforced composites of these resins have even been considered for replacement of metals in certain applications because they exhibit good modulus and heat distortion temperature (HDT) properties. Because interpolymers of this type are susceptible to attack by strong bases and ketone-containing compounds, the search continues for improved methods of protecting the resin and preventing its degradation.

U.S. Pat. No. 3,669,718 to Chiu et al. describes the coating for such articles which gives protection from the deleterious action of organic solvents. However, a coating which is resistant to attack by strong basic solutions has not been demonstrated.

SUMMARY OF THE INVENTION

Interpolymers containing maleic anhydride (MAH) can be protected from attack by strong bases by a process comprising forming a layer of cyclic imide precursors on the outer surface of an article and then heating the article at a temperature sufficient to form the cyclic imide. The precursor of the cyclic imide structure is typically produced by the addition of ammonium hydroxide to the surface of the article or to a water slurry of the MAH interpolymer. The $NH_4OH$ opens up the anhydride ring structure, thus forming the di-ammonium salt of the maleic acid structure. In a preferred embodiment, the articles to be protected are dipped in a pH-adjusted solution containing the salts of the MAH interpolymer resin.

DETAILED DESCRIPTION OF THE INVENTION

The articles which can be protected by the inventive process include any article to which a thin layer of maleic anhydride-containing interpolymer can be applied, and especially those which are subject to attack by strong bases. While the article to be treated need not contain any maleic anhydride, the process is particularly suited for those articles containing interpolymers having from about 10 to 50, preferably 25 to 50 mole percent maleic anhydride with one or more types of copolymers. As defined for this patent, interpolymer means a copolymer or terpolymer. These interpolymers can include, for example, 1-olefin/MAH resins such as di-isobutylene/MAH, 1-butene/MAH and the like, acrylate/MAH resins such as methyl methacrylate/MAH, indene/MAH and vinyl aromatic/MAH copolymers. Suitable vinyl aromatic substituents are monovinyl aromatic compounds such as styrene, vinyl toluene, p-butylstyrene, chlorostyrene, dichlorostyrene and the like. Styrene/MAH copolymer resins are preferred because they are readily available and relatively inexpensive.

As one illustration of MAH interpolymers useful in the inventive process, a styrene/MAH copolymer repeating unit is shown with the following structure:

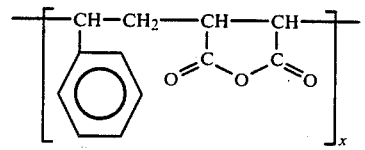

The MAH unit of the interpolymer is believed to react with the ammonium ions as shown below, and the remaining portion of the interpolymer, e.g. styrene, is abbreviated "Z". Heating the resulting salt of the MAH unit will eventually form a stable cyclic imide structure.

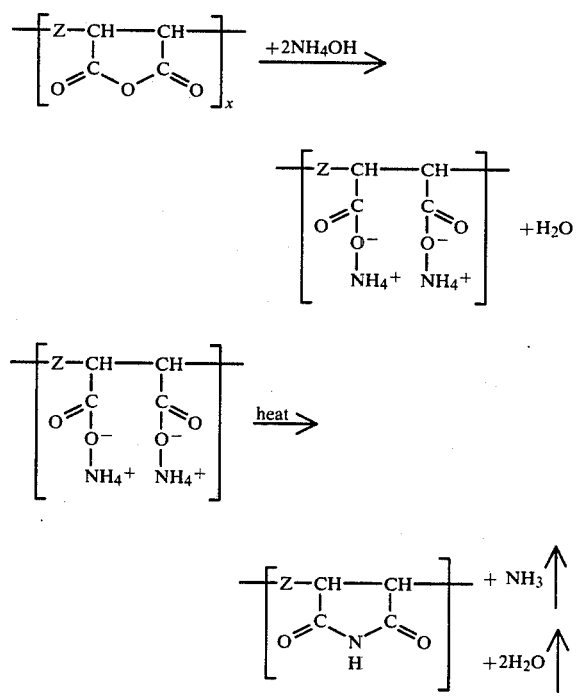

As shown in the examples, the cyclic imide precursors are typically the water-soluble di-ammonium salts of the MAH interpolymer. If the article to be treated contains MAH interpolymers, the cyclic imide precursors can be formed from the MAH units which are on the outer surface of the article itself. In this embodiment a basic solution containing primary amine or ammonium ions is applied to the article by, for example, dipping the article in ammonium hydroxide. The ammonium hydroxide breaks the MAH unit and forms the di-ammonium salt of MAH and water. While this embodiment is effective, it is less preferred because the solution will often simultaneously dissolve a small portion of the surface of the article which produces an eroded or pitted surface.

Preferably the protective interpolymer coating is applied by adding the cyclic imide precursors to the article in a separate layer. For example, a viscous solution of the water-soluble salts of the interpolymer can be used as a dipping bath for the article. The interpolymer in solution can be of the same or a different composition than the article which is being coated, as long as the interpolymer which is applied to the surface contains at least 10, preferably 25 to 50, mole percent MAH. The coating procedure will also smooth surface imperfections by filling in small cracks and pores and will result in an overall strengthened article by eliminating stress cracks.

The MAH salts can be formed from primary amines as well as ammonium ions. The ions that are useful in this invention have the formula $RNH_3^+$, where R is hydrogen or an alkyl group of from 1 to about 6 carbon atoms such that the compound will have sufficient basicity to open the maleic anhydride structure and will be soluble in the solvent used. Preferably R is hydrogen or an alkyl group having from 1 to 3 carbons, and most preferably R is hydrogen. Compounds where R is a branched-chain or substituted alkyl group, e.g. hydroxylamine, can also be used if the structure of the compound will not interfere with the formation of the cyclic imide. It will be understood that although the process description refers to ammonium ion, this term will include equivalent amine compounds.

To prepare a dipping solution, a slurry is made of the MAH interpolymer resin powder in a liquid medium such as water. The source of the ammonium ion is then added, e.g. ammonium hydroxide, and soluble salts of the MAH interpolymer begin to form. A large excess of ammonium hydroxide is initially advantageous for the rapid dissolution of the MAH interpolymer resin powder. If the coating solution is allowed to remain strongly basic, however, etching or dissolution of the surface will occur because of contact with the base during the coating process. Thus an especially preferred technique involves a pH-adjustment of the coating solution to a less basic solution so that the coating solution itself will not significantly decompose the surface of a resinous article during the treatment. This pH-adjustment can be accomplished by the addition of any organic or inorganic acid which will not deleteriously affect the coating solution such as, for example, sulfuric, nitric, acetic or hydrochloric acids. It is preferred to lower the pH after the aqueous solution of the interpolymer salt has been formed, because the resin powder is more easily hydrolyzed and dissolved in a more basic solution.

The solution should be adjusted as close to neutrality as possible while still maintaining a clear solution, to a pH range of about 8 to 10, preferably 8 to 9. Cloudiness in the solution indicates that the water-insoluble free acid form of the MAH interpolymer is being formed.

The article to be protected is dipped in the MAH interpolymer salt solution for a time which is sufficient to coat the article but which will minimize the harsh action of the basic solution, typically only a fraction of a minute. The coated article is then air-dried, optionally with heat. Further drying and heating will cause dehydration and formation of the cyclic imide structure. Temperatures between about 160° C. and 200° C., preferably 165° to 180° C. and most preferably 165° to 175° C. can be used. The temperature of the heat treatment must be high enough to form the cyclic imide structure on the MAH unit, but it is generally undesirable to heat to or near the HDT in order to avoid warping or cracking of the molded articles.

SPECIFIC EMBODIMENTS

A plurality of compression molded resin bars consisting of 50 mole percent styrene and 50 mole percent maleic anhydride copolymer resin were used to demonstrate the effects of this invention. The bars were $2\frac{1}{2} \times \frac{1}{2} \times \frac{1}{8}$ inches, and contained a small drilled hole so that they could be suspended with a thin wire.

COMPARATIVE EXAMPLE C-1

This comparative example illustrates formation of the di-ammonium salts of the interpolymer on the surface of the treated article, but the subsequent heat treatment was insufficient to form the cyclic imide structure.

A concentrated (28 to 30% by weight) ammonium hydroxide solution was prepared and four resin bars were submerged in the solution for different lengths of time as shown in Table I. Each bar was then removed from the solution and allowed to air dry at room temperature. The dried resin bars were then placed in a circulating air oven at 100° C. for about 1 hour, followed by 15 hours at 125° C. The oven temperature was again increased to 155° C. and maintained for an additional 3 hours. The effects of exposure to the concentrated ammonium hydroxide solution are shown in Table I.

Bars C and D showed especially severe weight loss after exposure to the ammonium hydroxide solution. Exposures as brief as 15 seconds were sufficient to form the di-ammonium salt of the MAH units, while exposures for longer times also dissolved the bar's surface layer into the concentrated ammonium hydroxide solution. When the dipping solution was later diluted with distilled water and rendered acidic by the addition of a strong hydrochloric acid solution, the dissolved polymer precipitated out of the solution, confirming that the treatment with concentrated ammonium hydroxide had dissolved a portion of the styrene/MAH copolymer bar.

TABLE I

| Effect of $NH_4OH$ on Non-Imidized Polymer Bars | | | | |
|---|---|---|---|---|
| | A | B | C | D |
| $NH_4OH$ bath, minutes | 0.25 | 1 | 4 | 16 |
| Initial wt of bar, grams | 4.14 | 4.79 | 4.26 | 4.41 |
| Wt after $NH_4OH$ bath and heat-drying at 155° C. | 4.10 | 4.72 | 4.09 | 4.10 |
| Wt loss, percent | 1.0% | 1.5% | 4.0% | 7.0% |

COMPARATIVE EXAMPLE C-2

This illustrates a test of the bars used in Comparative Example C-1 by subjecting the bars to a strongly basic solution. The identical test bars A, B, C and D were submerged for four hours in a 10% solution of TSP ($Na_3PO_4$ or trisodium phosphate) having a pH of 13 at room temperature. A resin bar which had not been treated with the ammonium hydroxide was also submerged in the TSP bath for comparison as a control.

All of the bars showed significant weight loss after immersing in the TSP solution, suggesting that a heat treatment of 155° C. for 3 hours was insufficient to imidize the MAH units. The bars having a longer exposure to the ammonium hydroxide solution probably contained a larger proportion of hydrolyzed MAH units and were more severely eroded by the highly basic TSP solution.

TABLE II

Effect of Trisodium Phosphate (TSP) on Non-Imidized Polymer Bars

|  | Control | A | B | C | D |
|---|---|---|---|---|---|
| Wt before TSP bath | 4.67 | 4.10 | 4.72 | 4.09 | 4.10 |
| Wt after TSP bath | 4.57 | 4.00 | 4.58 | 3.90 | 3.78 |
| Wt loss, percent | 2.1% | 2.4% | 3.0% | 4.6% | 7.8% |

EXAMPLE 1

This example illustrates the imidization of the MAH structure by heat treatment at a temperature sufficient to form the cyclic imide. A second solution of ammonium hydroxide was prepared by mixing equal amounts of concentrated (28–30% $NH_3$ by weight) and distilled water. This solution had pH of 13 at room temperature.

Two additional styrene/MAH resin bars, designated E and F in Table III, were submersed for varying times in the solution. The excess $NH_4OH$ was then rinsed from the bars by dipping them in a beaker of distilled water, and the surface water was then removed by patting the surface dry with a paper towel. The bars were air dried for 30 minutes with an additional 15 minutes heat drying under mild temperatures. The bars were then placed in a circulating hot air oven for 40 minutes at a temperature gradually increasing from 165° C. to 200° C. They were then submersed in a 10% TSP solution for 4 hours as in Comparative Example C-2. Results are shown in Table III. The control from C-2 is also included for comparison.

TABLE III

Effect of TSP on Imidized Polymer Bars

|  | Control | E | F |
|---|---|---|---|
| Initial wt of bar, grams | 4.67 | 5.22 | 4.89 |
| $NH_4OH$ exposure, minutes | None | 0.25 | 1 |
| Wt after $NH_4OH$ and heating, 165 to 200° C. | 4.67 | 5.19 | 4.84 |
| Wt after TSP bath | 4.57 | 5.18 | 4.82 |
| Wt loss from TSP | 2.1% | 0.19% | 0.41 |

The slight weight loss suffered by bars E and F suggested that the higher drying temperatures had been sufficient to form an imidized structure on the surface of the molded copolymer bar. In contrast, the control bar which had not been treated showed a weight loss of 2.1% when tested in the same TSP solution.

EXAMPLE 2

This example illustrates the formation of the cyclic imide precursors by applying them as a coating to the article. A solution of the ammonium salt of styrene/MAH copolymer resin was formed by dissolving 10.0 g of the resin in 90.0 g of distilled water and 10.0 g of concentrated ammonium hydroxide solution. This resulted in a 9% by weight solution of the ammonium salt of the copolymer, having a pH of 10.

Three styrene/MAH bars designated G, H and I were dipped in this solution for the times indicated. After removing the bars and air drying them for 2 days, they were placed in a circulating air oven for 45 minutes at temperatures gradually increasing from 175° C. to 195° C. The bars were then tested in a 10% trisodium phosphate solution at room temperature for 4 hours. The results are shown in Table IV.

TABLE IV

Effect of TSP on Resin Bars with Imidized Coated Layer

|  | G | H | I |
|---|---|---|---|
| Initial wt of bar, grams | 5.00 | 4.56 | 5.22 |
| Time (minutes) in coating solution, pH = 10 | 0.25 | 1 | 4 |
| Coating, wt added, grams | 0.02 | 0.02 | 0.01 |
| Wt loss after heating | 0.02 | 0.02 | 0.01 |
| Wt loss after TSP bath | 0.00 | 0.01 | 0.02 |
| Wt loss after TSP, % | 0% | 0.2% | 0.4% |

EXAMPLE 3

This example illustrates pH-adjustment of the coating solution. 10 grams of the copolymer resin as used in Example 2 were combined with ammonium hydroxide and water to form an 8% solution of the di-ammonium salt of styrene/MAH copolymer. After stirring for several hours, the solution was thinned by adding an additional 140 g of distilled water to form a 4% solution of the copolymer salt, having a pH of about 10. Concentrated acetic acid was added dropwise until the solution turned cloudy at a pH of about 8. This indicated that a trace amount of water-insoluble free acid had been formed during the addition of the final drop of concentrated acetic acid. At that point, several drops of concentrated ammonium hydroxide were added to redissolve the trace amount of the copolymeric free acid. As shown in Table V, resin bars were then dipped in this solution which was moderately viscous and had a pH of about 8.5. After drying and heating to form the cyclic imide structure, the bars were then tested in a TSP bath as in the previous examples.

TABLE V

Effect of TSP on Bars With pH-adjusted, Imidized Coating

|  | J | K | L |
|---|---|---|---|
| Initial Weight, grams | 4.245 | 4.453 | 5.052 |
| Time in dip solution, min | 0.25 | 1 | 4 |
| Coating, wt added | 0.005 | 0.002 | 0.003 |
| Wt loss after heating | 0.008 | 0.008 | 0.006 |
| Wt loss after TSP bath | 0.007 | 0.006 | 0.007 |
| Percent wt loss after TSP | 0.17% | 0.14% | 0.14% |

The above data shows that a weight loss of less than 0.2% is suffered when a pH-adjusted, imidized coating is applied to the resin bar, compared to a loss of 2.1% for an untreated (control) bar.

Although only a few embodiments have been specifically described, many modifications can be made without departing from the spirit and scope of the invention. These modifications are intended to be included within the scope of this invention, which is to be limited only by the following claims:

We claim:

1. A process for forming a protective surface on an article, the processing comprising producing a layer consisting essentially of $RNH_3^+$ salts of a maleic anhydride interpolymer on the surface of the article, where R is hydrogen or an alkyl group of from 1 to 6 carbon atoms, and heating the article at a temperature sufficient to form a cyclic imide structure.

2. The process of claim 1 in which the article contains from 10 to 50 mole percent MAH.

3. The process of claim 2 in which R is selected from H and an alkyl group having from 1 to 3 carbon atoms.

4. The process of claim 3 in which R is H.

5. The process of claim 4 in which the layer is added by applying a solution of dissolved salts of MAH interpolymers to the surface of the article.

6. The process of claim 5 in which the article consists of about 50 mole percent styrene and 50 mole percent maleic anhydride copolymer resin.

7. The process of claim 6 in which the article is coated with a solution of the di-ammonium salt of styrene-maleic anhydride copolymer resin.

8. The process of claim 7 in which coated article is heated at a temperature between about 160° C. and 200° C.

9. The process of claim 8 in which the temperature is between about 165° and 180° C.

10. The process of claim 9 in which the pH of the solution is adjusted to form a less basic solution.

11. The process of claim 10 in which the pH is adjusted to a value from about 8 to 9.

12. The article treated by the process of claim 1.

13. A process for forming a protective coating on an article consisting of 50 mole percent styrene and 50 mole percent maleic anhydride copolymer resin, the process comprising coating the surface of the article with a solution of the di-ammonium salts of 50% styrene/50% maleic anhydride copolymer resin, adjusting the pH to about 8.5, and heating the coated article at a temperature between 165° and 175° C.

* * * * *